UNITED STATES PATENT OFFICE.

JOHN HUGHES, OF STAPLETON, ASSIGNOR TO HIMSELF AND JOHN C. THOMPSON, OF NEW BRIGHTON, NEW YORK.

IMPROVEMENT IN THE MANUFACTURE OF ACIDS AND PAINTS FROM THE MATERIALS USED TO PURIFY GAS.

Specification forming part of Letters Patent No. 127,350, dated May 28, 1872.

Specification describing certain Improvements in the Manufacture of Sulphuric and Sulphurous Acids, invented by JOHN HUGHES, of Stapleton, Staten Island, New York.

The object of my invention is to furnish a cheap and easily-obtainable base from which to manufacture sulphurous and sulphuric acids; and it consists in the utilization, for that purpose, of the spent purifying materials used in the refining of gas, as hereinafter set forth; and it further consists in the utilization of some of the waste materials after they have served as a base from which to manufacture the acid, as recited, as a base for the manufacture of paint.

As is well known, all gas-coals or coals from which illuminating-gas is usually made contain a large percentage of sulphur, and that this sulphur is one of the principal impurities. In the manufacture of the gas this sulphur is vaporized and combines with a portion of the hydrogen formed so that the gas as it issues from the retort consists mainly of carbureted hydrogen with a large admixture of sulphureted hydrogen, and this latter is the impurity which the purifying agents are intended to absorb and eliminate from the carbureted hydrogen, which is the illuminating-gas. For this purpose lime, iron, iron-ores, resins, pitch, iron-borings, filings and turnings, peat, coal, coke, turf, spent hops, cotton waste, refuse metals, sulphate of copper, sulphate of iron, stone-dust, spent tan, seeds, nuts, oxides of iron and of manganese, and many others have been used, and by various processes not necessary to further mention. In the purifiers these substances absorb the sulphureted hydrogen, some by a merely mechanical absorption, others by chemical changes, as, for instance, where manganese is used it gradually becomes an hydrated sulphuret of manganese, while dry or wet lime becomes perfectly saturated with sulphureted hydrogen without any chemical change being developed by the sulphur itself.

My method or process of manufacturing the acids specified is to take the materials from the purifiers after they have become fully saturated with the impurities or "spent," as it is technically called, and subject them to the action of heat in a closed retort or suitable vessel, to a degree sufficient to liberate and vaporize the sulphur therein contained. These vapors we then condense and concentrate by any of the well-known methods used in the manufacture of sulphurous and sulphuric acids. By this process I utilize what has hitherto been considered only a waste product, manufacturing a valuble commercial product from a refuse, the supply of which is practically illimitable, and which has had no value whatever, and the disposal of which has been a difficult problem to solve.

The second portion of my invention relates to the further utilization of the iron-ores. As is well known, iron filings, turnings, and borings, and oxides of iron are greatly used in the refining of gas. I have found that when such waste materials have been treated by my process for recovering and utilizing the sulphur, that, by the degree of heat to which they were subjected, all other impurities have been burnt out, and that the residuum is a pure oxide of iron, or one very nearly so—that even metallic iron, if in small fragments, has become thoroughly oxidized. The resultant oxide is a friable mass of a very uniform color, (reddish brown,) and furnishes an excellent base for paints. This oxide residuum I take and crush and bolt. The flour thereof I then mix and grind with oil and other substances in the usual method of making mineral paints.

What I claim as my invention is—

1. Saturated or spent gas-purifying materials as a base for the manufacture of acids, substantially as herein set forth.
2. The manufacture of acids from the waste or spent gas-purifying materials, substantially as set forth.
3. The process herein described of manufacturing acids from spent or waste gas purifying materials, substantially as set forth.
4. As a base for paints, the metallic oxides prepared as herein specified.
5. The process herein described of preparing a base for mineral paints from waste gas-purifying materials.

To the above I have signed my name this 19th day of April, 1872.

JOHN HUGHES.

Witnesses:
THOS. HUGHES,
JAMES P. EDDY.